United States Patent [19]
Martin

[11] 3,732,998
[45] May 15, 1973

[54] BOAT RACK

[75] Inventor: Marion A. Martin, Baton Rouge, La.

[73] Assignee: The Raymond Lee Organization, Inc., New York, N.Y.

[22] Filed: Sept. 28, 1971

[21] Appl. No.: 184,548

[52] U.S. Cl. .................................................. 214/450
[51] Int. Cl. ............................................... B60r 9/00
[58] Field of Search .................. 214/450, 515, 517, 214/505; 296/1 A, 23 B, 23 MC

[56] References Cited
UNITED STATES PATENTS

| 3,648,866 | 3/1972 | Slown | 214/450 |
| 3,411,644 | 11/1968 | Cook | 214/450 |
| 3,097,755 | 7/1963 | Fulcher | 214/505 |
| 2,534,156 | 12/1950 | Wyatt | 214/517 |
| 1,713,271 | 5/1929 | Eason | 214/517 |

Primary Examiner—Gerald M. Forlenza
Assistant Examiner—John Mannix
Attorney—Howard I. Podell

[57] ABSTRACT

An improved boat rack capable of carrying a boat which is mounted on a trailer, with provisions for mounting the boat rack on the top of a pick-up truck.

3 Claims, 4 Drawing Figures

PATENTED MAY 15 1973 3,732,998

INVENTOR
MARION A. MARTIN
By Howard I. Podell
AGENT

BOAT RACK

The purpose of my invention is to enable the carrying on a truck-mounted rack of a small boat mounted on a conventional boat trailer.

The present wide-spread use of truck-towed camping equipment, necessitates the storage of small boats on top of the towing truck or on top of the towed camping equipment.

Previous developments in this area have consisted primarily in truck-mounted racks to carry the boat itself, but such provisions have not been completely satisfactory, since they provided no means of handling the heavy boat after it was removed from the truck rack, prior to launching it at the shore line. By use of my invention, the boat is first mounted on a conventional boat trailer which can be manuevered at the shore line after removal from the truck-mounted rack, to launch the boat. In fact if necessary, the boat trailer can be rolled down the launching ramp into the water to release or pick-up the boat in the conventional fashion.

In loading the boat and boat trailer on my truck mounted rack, the rack unfolds to provide an inclined ramp for the rear wheels of the boat trailer, and a winch mechanism is used on the truck to pull the boat and trailer up the ramp and over the truck body.

BRIEF DESCRIPTION OF THE DRAWINGS

The objects and features of the invention may be understood with reference to the following detailed description of an illustrative embodiment of the invention taken together with the accompanying drawings in which.

DESCRIPTION OF THE PREFERRED EMBODIMENT

Figure 1:
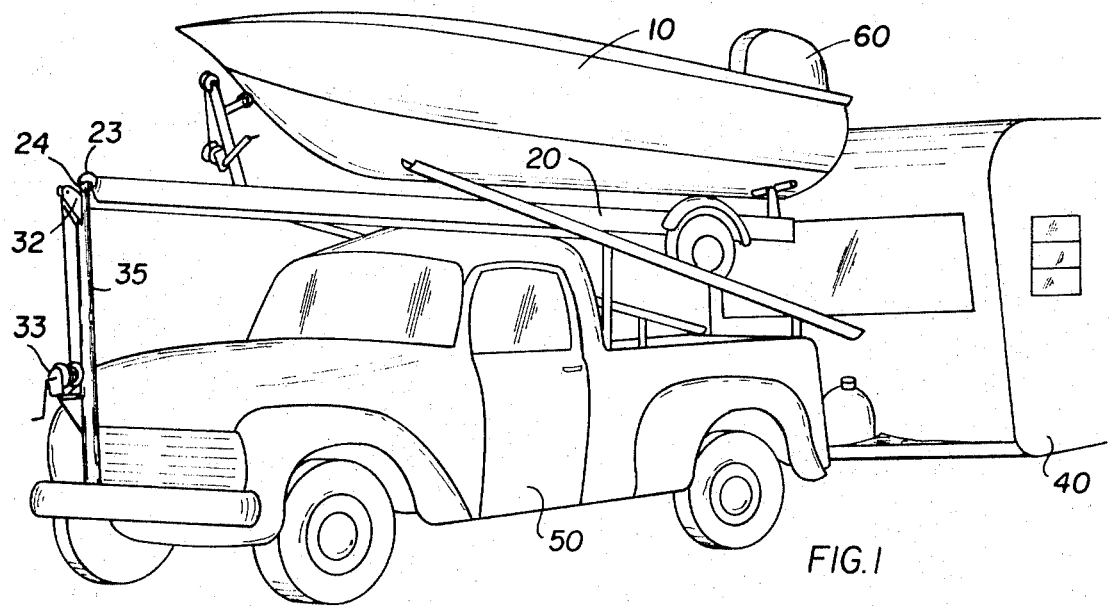
FIG. 1 is a perspective view of the boat and trailer mounted on the rack over a pick-up truck.

Turning now descriptively to the drawings in which similar reference characters denote similar elements through the several views, FIG. 1 illustrates the boat 10 and boat trailer 20 stowed on rack 30 mounted to pick-up truck 50. As indicated in FIG. 1, the rack stowage on top of the truck 50 permits the truck to tow a camper 40 at the same time.

Figure 2:
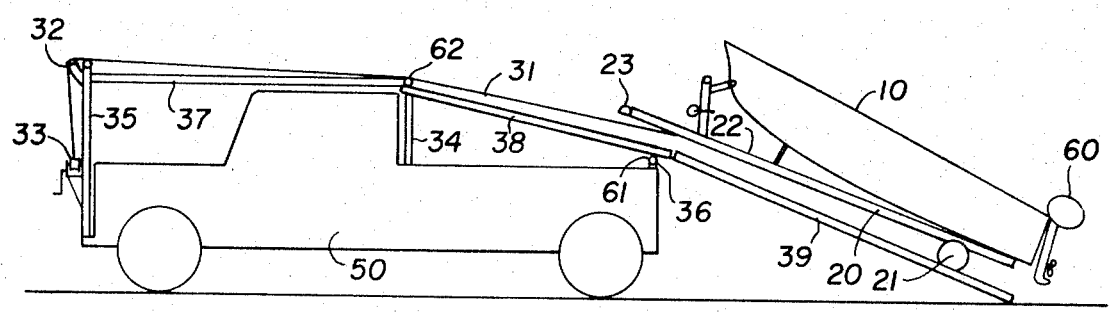
FIG. 2 is an elevation drawing illustrating the raising of the boat and trailer on the ramp of the rack.
Figure 3:
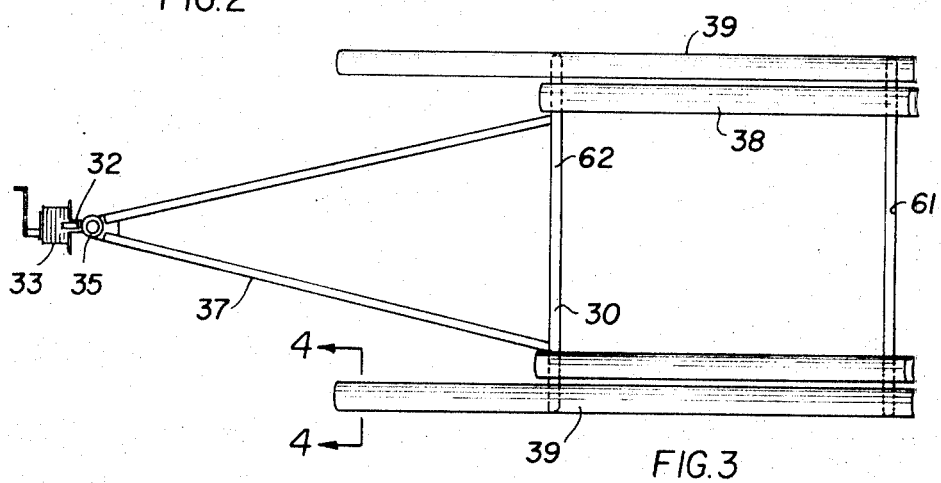
FIG. 3 is a plan view of the rack.

In FIG. 2, the boat 10 is being hauled up the ramp rack 39 and 38 by means of a line 31 which is carried over pulley 32 and tightened by winch 33. A feature of my invention is that ramps 38 and 39 are required solely for the wheels 21 at the rear of boat trailer 20, with no support required during the loading or unloading operation under the front section 22 of the boat trailer due to the normal weight relations of boats mounted on such trailers.

The rack is supported on truck 50 by forward vertical support 35, mid-vertical supports 34, and rear supports 36.

Figure 4:
FIG. 4 is a cross-section of plan 4—4 of FIG. 3.

Ramp members 39 are stored on horizontal members 61 and 62 when not in use. The concave cross-section of ramps 38 and 39 as shown in FIG. 4 assist in aligning the wheels 21 of the boat trailer 20 with the ramps.

In the installed position, as shown in FIG. 1, the boat and boat trailer is locked into place by means of the female locking member 23 of the conventional trailer hitch locking over the ball section 24 mounted on vertical support 35, using the conventional trailer hitch latching means. Further security is provided by means of a chain and turnbuckle shackle which may be fastened about ramps 38 and over axle of the boat trailer. In the preferred embodiment, one end of the chain is welded to one ramp member 38, with the adjustable turnbuckle and locking shackle welded to the other ramp member 38. The turnbuckle may be tightened after the chain is latched to the shackle.

When the boat is unloaded near the water, the boat and trailer are lowered down the ramp, using winch 33 to control the movement, and the boat and trailer can then be rolled on the ground in the usual fashion to the launching ramp, at the water's edge.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new, and desire to secure by Letters Patent of the United States is:

1. An improved rack structure mounted on the body of a pick-up truck for the purpose of transporting a boat trailer carrying a boat, with means to pull the laden boat trailer from the ground level to the stowed position on top of the rack, and means to secure the laden boat trailer in the stowed position and means to lower the laden trailer from the stowed position to the ground level, where the means to secure the laden trailer in the stowed position consists of a ball member fastened to the rack structure which mates with the female latching socket structure of the boat trailer, and where the means to raise the boat trailer to the stowed position includes a winch mechanism fastened to the rack structure, in which the rack is supported by a vertical member forward of the engine of said vehicle and by at least two vertical members at the rear of the vehicle and by at least two additional vertical members, with the rack section between these additional vertical members and the rear-most vertical members including two concave members, each of which supports a wheel of the boat trailer in the stowed position.

2. An improved rack structure mounted on the body of a vehicle as described in claim 1 which has provisions for mounting two additional concave members so as to serve as an inclined ramp on which the two wheels of the boat trailer ride from the ground level to the rack members which support the wheels of the boat trailer in the stowed position.

3. An improved rack structure mounted on the body of a vehicle as described in claim 2 which has provisions for mounting the two ramp members in the stowed position adjacent to the members which support the wheels of the boat trailer in the stowed position.

* * * * *